United States Patent
Tong

(10) Patent No.: US 9,892,259 B2
(45) Date of Patent: Feb. 13, 2018

(54) SECURITY PROTECTION SYSTEM AND METHOD

(71) Applicant: TENCENT TECHNOLOGY (SHENZHEN) COMPANY LIMITED, Shenzhen (CN)

(72) Inventor: Lei Tong, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 252 days.

(21) Appl. No.: 14/665,529

(22) Filed: Mar. 23, 2015

(65) Prior Publication Data

US 2015/0193624 A1 Jul. 9, 2015

Related U.S. Application Data

(63) Continuation of application No. PCT/CN2013/083437, filed on Sep. 13, 2013.

(30) Foreign Application Priority Data

Sep. 28, 2012 (CN) .......................... 2012 1 0367530

(51) Int. Cl.
G06F 21/00 (2013.01)
G06F 21/57 (2013.01)
G06F 9/445 (2006.01)

(52) U.S. Cl.
CPC .............. *G06F 21/577* (2013.01); *G06F 8/65* (2013.01); *G06F 2221/033* (2013.01); *G06F 2221/034* (2013.01)

(58) Field of Classification Search
None
See application file for complete search history.

(56) References Cited

U.S. PATENT DOCUMENTS 7,213,154 B1* 5/2007 Carter ................... G06F 21/564
  709/223
7,370,345 B2* 5/2008 Bardsley ............... G06F 21/577
  726/11

(Continued)

FOREIGN PATENT DOCUMENTS

CN 102156650 A 8/2011
CN 102185859 A 9/2011

(Continued)

OTHER PUBLICATIONS

Office Action Issued in Chinese Patent Application No. 2012103675300, dated Feb. 15, 2016, 10 pages.

(Continued)

*Primary Examiner* — Maung Lwin
(74) *Attorney, Agent, or Firm* — Brinks Gilson & Lione

(57) ABSTRACT

A security protection system is provided. The system includes: a vulnerability identification device, to collect patch file information, identify a vulnerability of a to-be-fixed object corresponding to the patch file information and generate vulnerability protection information according to the vulnerability; and a vulnerability protection device, to protect the vulnerability of the to-be-fixed object corresponding to the patch file information according to the vulnerability protection information. A security protection method is provided in the present disclosure. The present disclosure may provide effective protection to the computer actively and timely and protect the vulnerability of the computer from illegal utilization.

9 Claims, 4 Drawing Sheets

(56) References Cited

U.S. PATENT DOCUMENTS

| | | | |
|---|---|---|---|
| 7,530,104 B1 * | 5/2009 | Thrower | G06F 21/554 713/188 |
| 8,468,516 B1 * | 6/2013 | Chen | G06F 8/67 707/687 |
| 8,973,088 B1 * | 3/2015 | Leung | H04L 63/00 726/1 |
| 2003/0140249 A1 * | 7/2003 | Taninaka | G06F 21/577 726/25 |
| 2004/0006704 A1 * | 1/2004 | Dahlstrom | G06F 21/577 726/25 |
| 2004/0210653 A1 * | 10/2004 | Kanoor | G06F 8/65 709/223 |
| 2005/0039046 A1 * | 2/2005 | Bardsley | G06F 21/577 726/4 |
| 2006/0015941 A1 * | 1/2006 | McKenna | G06F 21/55 726/23 |
| 2006/0117310 A1 * | 6/2006 | Daniels | G06F 8/68 717/168 |
| 2006/0185018 A1 | 8/2006 | Saretto et al. | |
| 2006/0218635 A1 * | 9/2006 | Kramer | G06F 21/56 726/22 |
| 2009/0144827 A1 | 6/2009 | Peinado et al. | |
| 2011/0231935 A1 * | 9/2011 | Gula | H04L 43/028 726/25 |
| 2012/0124581 A1 * | 5/2012 | Nitta | G06F 8/65 718/1 |
| 2015/0207811 A1 * | 7/2015 | Feher | G06F 21/577 726/25 |

FOREIGN PATENT DOCUMENTS

| | | | |
|---|---|---|---|
| CN | 102693396 A | 9/2012 | |
| WO | WO 2014021866 A1 * | 2/2014 | G06F 21/577 |

OTHER PUBLICATIONS

International Preliminary Report and Written Opinion of the International Searching Authority for International Application No. PCT/CN2013/083437, dated Mar. 31, 2015, 7 pages.

International Search Report for International Application No. PCT/CN2013/083437, dated Dec. 19, 2013.

* cited by examiner

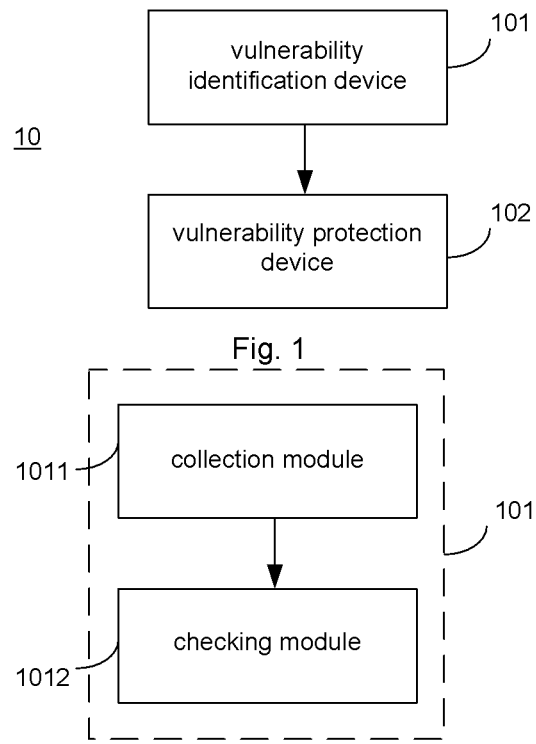
Fig. 1
Fig. 2
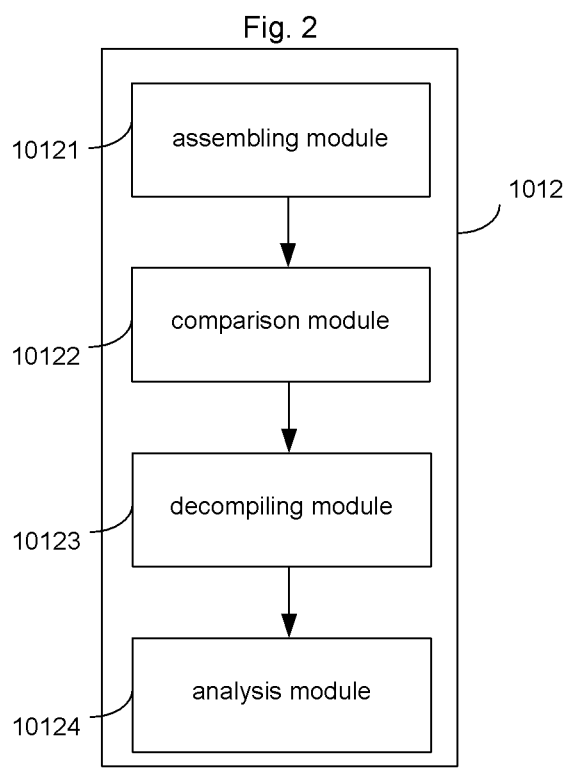
Fig. 3

SECURITY PROTECTION SYSTEM AND METHOD

CROSS-REFERENCE TO RELATED APPLICATIONS

This application is a continuation of International Application No. PCT/CN2013/083437, filed on Sep. 13, 2013, which claims priority to Chinese patent application No. 201210367530.0, filed on Sep. 28, 2012, the disclosures of which are hereby incorporated by reference herein in their entireties.

FIELD OF THE INVENTION

The present disclosure relates to a security software field, and more particularly, to a security protection system and method.

BACKGROUND

In practice, computers are equipped with security software. One of the necessary functions of the computer is detecting and fixing vulnerabilities of the computer to protect the vulnerabilities of the compute from illegal utilization, detect invasion of malware using the vulnerabilities of the computer right the first time and protect the computer from invasion. Therefore, the computer may be protected.

SUMMARY

The present disclosure provides a security protection system, which may provide effective protection to the computer actively and timely and protect the vulnerability of the computer from illegal utilization.

In order to solve the above problem, the present disclosure provides a security protection system. The system includes: a vulnerability identification device, to collect patch file information, identify a vulnerability of a to-be-fixed object corresponding to the patch file information and generate vulnerability protection information according to the vulnerability; and a vulnerability protection device, to protect the vulnerability of the to-be-fixed object corresponding to the patch file information according to the vulnerability protection information.

The present disclosure also provides a security protection method, which may provide effective protection to the computer actively and timely and protect the vulnerability of the computer from illegal utilization.

In order to solve the above problem, the present disclosure provides a security protection method. This method includes: collecting patch file information, identifying a vulnerability of a to-be-fixed object corresponding to the patch file information and generating vulnerability protection information according to the vulnerability; and protecting the vulnerability of the to-be-fixed object corresponding to the patch file information according to the vulnerability protection information.

Compared with the conventional method, in the present disclosure the details of the vulnerability may be clearly obtained by comparing the patch files on the assembling level. Since the triggering information is set for the vulnerability, the operation for triggering the vulnerability is monitored to intercept the operation for triggering the vulnerability. The present disclosure may provide effective protection to the computer actively and timely and protect the vulnerability of the computer from illegal utilization.

BRIEF DESCRIPTION OF THE DRAWINGS

FIG. 1 is a schematic diagram illustrating a security protection system in accordance with an example of the present disclosure;

FIG. 2 is a schematic diagram illustrating a vulnerability identification device in FIG. 1;

FIG. 3 is a schematic diagram illustrating a checking module in FIG. 2;

DETAILED DESCRIPTION

Figure 4:
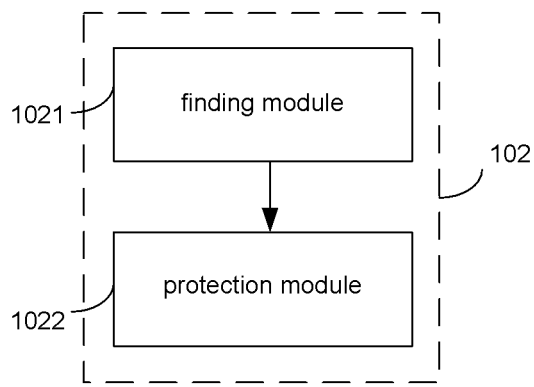
FIG. 4 is a schematic diagram of a vulnerability protection device in FIG. 1.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

After a software developer releases a patch file of software with vulnerabilities, security software searches for the vulnerabilities and fixes the vulnerabilities.

In the above technical scheme, it is time and resource consuming to fix the vulnerabilities via patching the software. Generally, the security software cannot automatically patch the software. Instead, the user needs to initiate the operation for fixing the vulnerabilities. Actually, the user lacking of safety consciousness may not fix the vulnerabilities of the computer, resulting in that the security software cannot protect the computer. Furthermore, only after the user initiates the operation for fixing the vulnerabilities, the security software may fix the vulnerabilities according to features of the vulnerabilities. Therefore, compared with the detection of the vulnerabilities, the protection of the vulnerabilities is passive and lagging which is not conductive to actively and timely prevent the vulnerabilities from illegal utilization.

Furthermore, the above security software does not know details of the vulnerabilities. What the software developer can do is pushing a patch file package to the user. The user cannot enjoy the real-time vulnerability protection. Therefore, the above technical scheme for fixing the vulnerabilities of the software has less flexibility and poor initiative and cannot effectively protect the vulnerabilities from illegal utilization.

In order to protect a vulnerability in a computer of a user from illegal utilization and better protect the computer of the user, the present disclosure provides the following technical scheme: collecting patch file information, identifying a vulnerability according to the patch file information, generating vulnerability protection information, searching for a vulnerability according to the vulnerability protection information, setting triggering information on the vulnerability to monitor whether the vulnerability is triggered and intercepting an operation for triggering the vulnerability when the vulnerability is triggered. Therefore, the technical scheme of the present disclosure may actively and timely protect the computer of the user and protect the vulnerability of the computer from illegal utilization.

The detailed technical scheme of the present disclosure is as follows.

Figure 5:
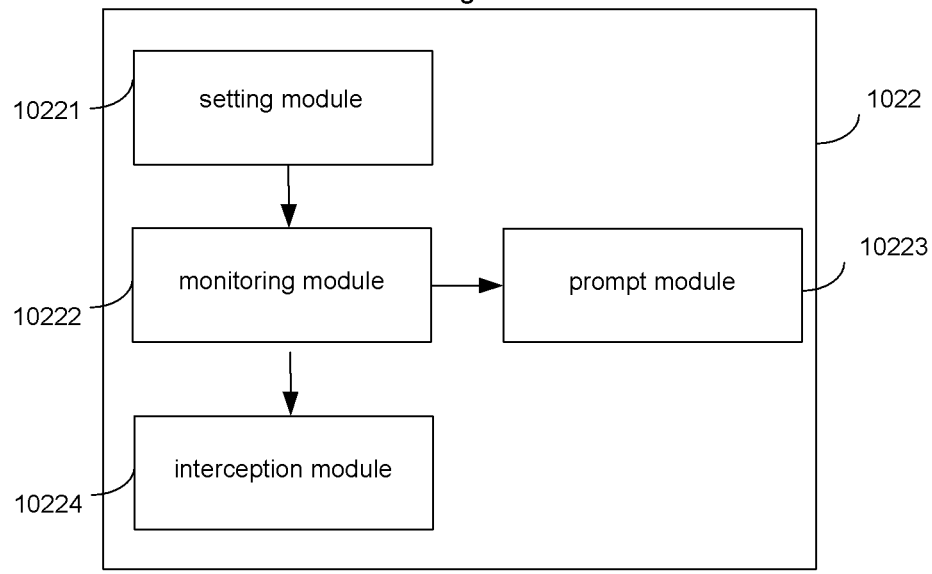
FIG. 5 is a schematic diagram illustrating a protection module in FIG. 4.

Referring to FIGS. 1 to 5, FIG. 1 is the schematic diagram illustrating a security protection system in accordance with an example of the present disclosure, FIG. 2 is a schematic diagram illustrating a vulnerability identification device 101 in FIG. 1, FIG. 3 is a schematic diagram illustrating a checking module 1012 in FIG. 2, FIG. 4 is a schematic diagram illustrating a vulnerability protection device 102 in FIG. 1 and FIG. 5 is a schematic diagram illustrating a protection module 1022 in FIG. 4.

The security protection system 10 in the present disclosure includes a vulnerability identification device 101 and a vulnerability protection device 102. The vulnerability identification device 101 and the vulnerability protection device 102 electrically connect with each other and communicate via a network.

The vulnerability identification device 101 is to collect patch file information, identify a vulnerability of a to-be-fixed object corresponding to the patch file information and generate vulnerability protection information according to the vulnerability.

In practice, the vulnerability identification device 101 is to dynamically search for whether a software developer has released the patch file information, collect the patch file information and source file information of the to-be-fixed object corresponding to the patch file information when the patch file information is found, analyze the patch file information and the source file information of the to-be-fixed object corresponding to the patch file information, identify the vulnerability corresponding to the patch file information and generate vulnerability protection information.

The vulnerability protection device 102 is to protect the vulnerability of the to-be-fixed object corresponding to the patch file information according to the vulnerability protection information.

In practice, the vulnerability protection device 102 is to search for (scans) the vulnerability corresponding to the to-be-fixed object according to the vulnerability protection information after receiving the vulnerability protection information from the vulnerability identification device 101, set triggering information on the vulnerability after finding the vulnerability, monitor the triggering information and intercept an operation for triggering the vulnerability if it is monitored that the triggering information is triggered.

The vulnerability identification device 101 includes a collection module 1011 and a checking module 1012. The collection module 1011 and the checking module 1012 electrically connect with each other.

The collection module 1011 is to collect the patch file information and the source file information of the to-be-fixed object corresponding to the patch file information.

In practice, the collection module 1011 is to dynamically search for whether the software developer has released the patch file information and obtain the patch file information after the patch file information is found.

Furthermore, the collection module 1011 is further to obtain the source file information of the to-be-fixed object corresponding to the patch file information according to the obtained patch file information.

In this way, it is conductive to obtain which patch files are released by the software developer right the first time, which guarantees that the vulnerabilities corresponding to the released patch files may be timely identified and the vulnerabilities may be protected.

The checking module 1012 is to check the vulnerability according to the patch file information and the source file information and generate the vulnerability protection information. In practice, the checking module 1012 is to analyze the patch file information and the source file information, identify the vulnerability corresponding to the patch file and generate the corresponding vulnerability protection information.

Furthermore, in order to identify the vulnerability corresponding to the patch file information, the checking module 1012 includes a comparison module 10122 and an analysis module 10124. The comparison module 10122 and the analysis module 10124 electrically connect with each other.

The comparison module 10122 is to compare the patch file information and the source file information to find differences between the patch file information and the source file information. The analysis module 10124 is to analyze the vulnerability of the to-be-fixed object of the patch file information according to the differences and generate the vulnerability protection information corresponding to the vulnerability.

In order to precisely identify the vulnerability corresponding to the patch file information, the checking module 1012 further includes an assembling module 10121 and a decompiling module 10123. The assembling module 10121 and the collection module 1011 electrically connect with each other. The assembling module 10121 and the comparison module 10122 electrically connect with each other. The decompiling module 10123 electrically connects with the comparison module 10122 and the analysis module 10124.

The assembling module 10121 is to assemble the patch file information, generate a first assembling result, assemble the source file information and generate a second assembling result. The assembling module 10121 converts the patch file information into an assembly language to obtain the first assembling result. The assembling module 10121 is further to convert the source file information corresponding to the patch file information into the assembly language to obtain the second assembling result. It is conductive for the comparison module 10122 to precisely identify the vulnerability corresponding to the patch file information by converting the patch file information and the source file information corresponding to the patch file information into the assembly language.

The comparison module 10122 is further to compare the first assembling result and the second assembling result to find differences between the first assembling result and the second assembling result. In the comparison process, the comparison module 10122 extracts identical functions, entirely different functions and differential functions. As for the differential functions, the comparison module 10122 is further to determine whether the differential functions belong to misinformation and delete the misinformation if the differential functions belong to the misinformation. The differences between the first assembling result and the second assembling result include the entirely different functions and the differential functions.

The decompiling module 10123 is to decompile the differences and generate a decompiling result. The decompiling module 10123 is to decompile the differences for high-level language to provide the analysis module 10124 with a basis, with which the vulnerability is analyzed.

The analysis module 10124 is further to analyze the vulnerability of the to-be-fixed object corresponding to the patch file information according to the de-compilation result. In practice, the analysis module 10124 is to analyze the de-compilation result according to security strategies to find the vulnerability of the to-be-fixed object corresponding to the patch file information and generate the vulnerability protection information corresponding to the vulnerability after finding the vulnerability. The vulnerability protection information is generated according to the security strategies. For instance, the vulnerability protection information includes position of the vulnerability and operations that the vulnerability may be illegally utilized, etc. The vulnerability protection information may be a vulnerability database or other binary codes.

The vulnerability protection device 102 includes a finding module 1021 and a protection module 1022. The finding module 1021 electrically connects with the protection module 1022. The finding module 1021 is to find the vulnerability according to the vulnerability protection information. In practice, the finding module 1021 is to find the vulnerability corresponding to the vulnerability protection information on the computer of the user according to the vulnerability protection information. The protection module 1022 is to protect the vulnerability according to the vulnerability protection information.

In order to protect the vulnerability, the protection module 1022 includes a setting module 10221, a monitoring module 10222 and an interception module 10224. The setting module 10221 electrically connects with the finding module 1021 and the monitoring module 10222. The monitoring module 10222 electrically connects with the interception module 10224.

The setting module 10221 is to generate triggering information according to the vulnerability protection information and set the triggering information for the vulnerability. In practice, the setting module 10221 sets the triggering information for the vulnerability via the following methods: The setting module 10221 encrypts a file associated with the vulnerability. In any operation accessing the file, a correct key should be carried. In this example, encryption information is the triggering information. Any abnormal decryption operation performed on the file is the operation triggering the vulnerability. A link file is added to a directory, at which the file associated with the vulnerability is located, so that the link file links the file associated with the vulnerability. Furthermore, accessing priorities are respectively set for the link file and the file associated with the vulnerability. The accessing priority of the link file is higher than that of the file associated with the vulnerability. In this example, the link file is the triggering information. An operation for accessing the link file is the operation for triggering the vulnerability.

The monitoring module 10222 is to monitor whether the operation for triggering the vulnerability is performed according to the triggering information and generate a monitoring result. The monitoring module 10222 is to monitor the operation for triggering the vulnerability according to a triggering signal sent out by the triggering information.

The interception module 10224 is to intercept the operation for triggering the vulnerability if the monitoring result is finding the operation for triggering the vulnerability.

The protection module 1022 further includes a prompt module 10223. The monitoring module 10222 electrically connects with the prompt module 10223. The prompt module 10223 is to send prompt information to the user if the monitoring result is finding the operation for triggering the vulnerability.

Figure 6A:
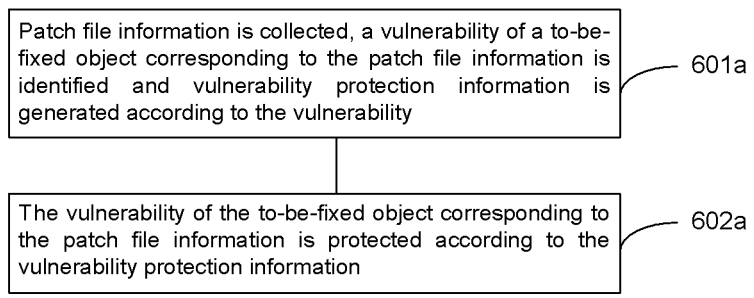
FIG. 6a is a flow chart illustrating a security protection method in accordance with an example of the present disclosure.

FIG. 6a is a flow chart illustrating a security protection method in accordance with an example of the present disclosure;

In block 601a, patch file information is collected, a vulnerability of a to-be-fixed object corresponding to the patch file information is identified and vulnerability protection information is generated according to the vulnerability.

In block 602a, the vulnerability of the to-be-fixed object corresponding to the patch file information is protected according to the vulnerability protection information.

Figure 6:
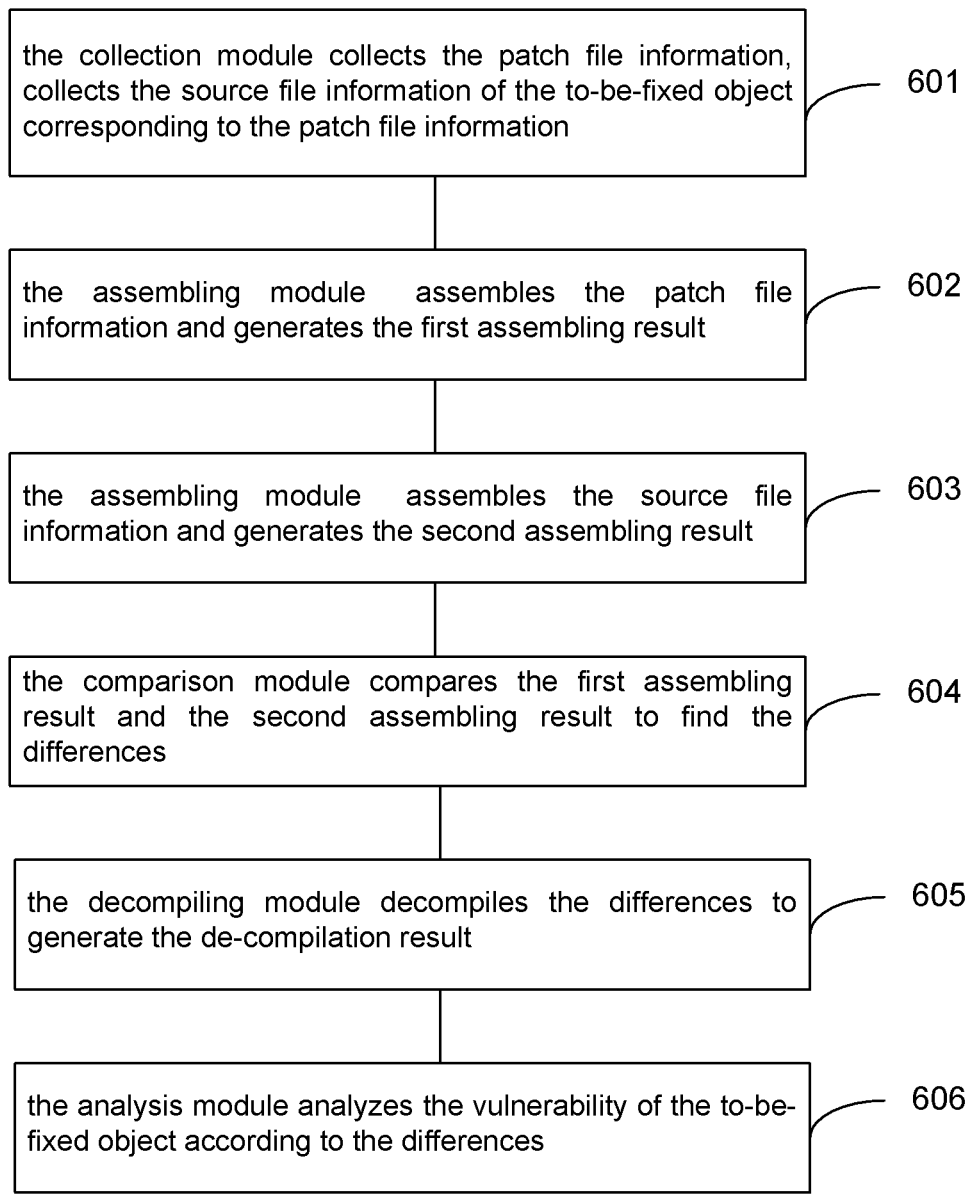
FIG. 6 is a flow chart illustrating a method for generating vulnerability protection information in accordance with an example of the present disclosure.

FIG. 6 is a flow chart illustrating a method for generating vulnerability protection information in accordance with an example of the present disclosure.

In blocks 601 to 607, the vulnerability identification device 101 collects the patch file information and identifies the vulnerability of the to-be-fixed object corresponding to the patch file information and generates the vulnerability protection information according to the vulnerability. The vulnerability identification device 101 dynamically searches for whether the software developer has released the patch file information, collects the patch file information and source file information of the to-be-fixed object corresponding to the patch file information after finding the patch file information, analyzes the patch file information and the source file information of the to-be-fixed object corresponding to the patch file information, identifies the vulnerability corresponding to the patch file information and generates the vulnerability protection information.

In block 601, the collection module 1011 collects the patch file information, collects the source file information of the to-be-fixed object corresponding to the patch file information. In practice, the collection module 1011 dynamically searches for whether the software developer has released the patch file information, collects (obtains) the patch file information after finding the patch file information. Furthermore, the collection module 1011 is further to collects (obtains) the source file information of the to-be-fixed object corresponding to the collected patch file information. In this way, it is conductive to obtain which patch files are released by the software developer right the first time, which guarantees that the vulnerability corresponding to the released patch file may be timely identified and the vulnerability may be protected.

In blocks 602 to 606, the checking module 1012 checks the vulnerability according to the patch file information and the source file information and generates the vulnerability protection information. In practice, the checking module 1012 analyzes the patch file information and the source file information, identifies the vulnerability corresponding to the patch file and generates the corresponding vulnerability protection information.

In block 602, the assembling module 10121 assembles the patch file information and generates the first assembling result. In practice, the assembling module 10121 converts the patch file information into the assembling language and obtains the first assembling result.

In block 603, the assembling module 10121 assembles the source file information and generates the second assembling result. In practice, the assembling module 10121 converts the source file information corresponding to the patch file information into the assembling language and obtains the second assembling result.

In the above blocks 602 and 603, it is conductive to accurately identify the vulnerability corresponding to the patch file information by converting the patch file information and the source file information corresponding to the patch file information into the assembling language.

In block 604, the comparison module 10122 compares the first assembling result and the second assembling result to find the differences between the first assembling result and the second assembling result. In the comparison process, the comparison module 10122 extracts identical functions, entirely different functions and differential functions. As for the differential functions, the comparison module 10122 is further to determine whether the differential functions belong to misinformation and delete the misinformation if the differential functions belong to the misinformation. The differences between the first assembling result and the second assembling result include the entirely different functions and the differential functions.

In block 605, the decompiling module 10123 decompiles the differences to generate the de-compilation result. In practice, the decompiling module 10123 decompiles the differences for high-level language to provide the analysis module 10124 with a basis, with which the vulnerability is analyzed.

In block 606, the analysis module 10124 analyzes the vulnerability of the to-be-fixed object corresponding to the patch file information according to the de-compilation result. In practice, the analysis module 10124 analyzes the de-compilation result according to security strategies to find the vulnerability of the to-be-fixed object corresponding to the patch file information and generates the vulnerability protection information corresponding to the vulnerability after finding the vulnerability. The vulnerability protection information is generated according to the security strategies. For instance, the vulnerability protection information includes position of the vulnerability and operations that the vulnerability may be illegally utilized, etc. The vulnerability protection information may be a vulnerability database or other binary codes.

Figure 7:
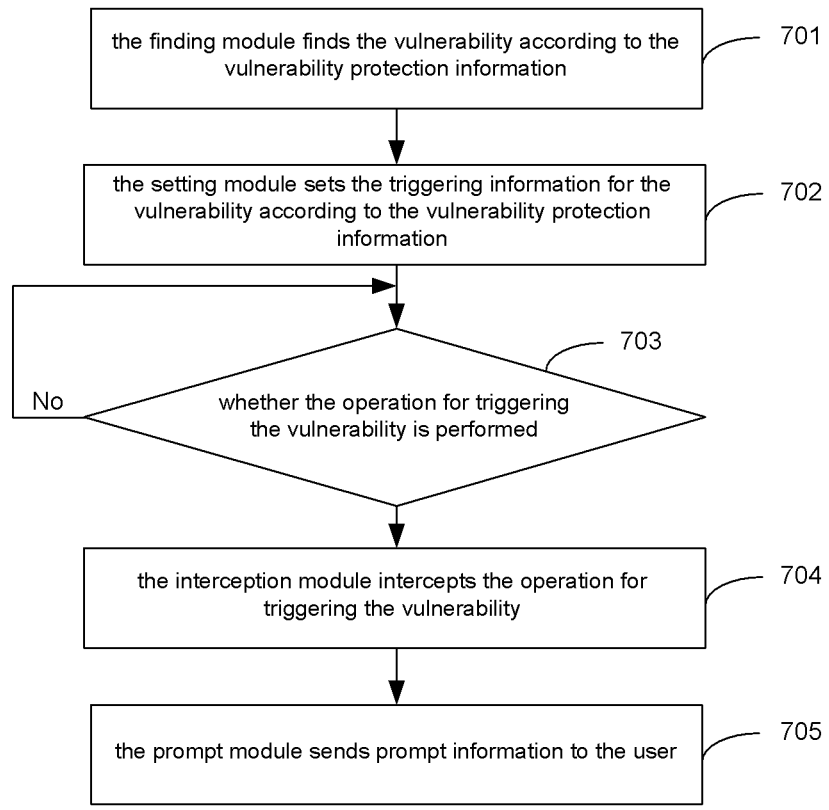
FIG. 7 is a flow chart illustrating a method for intercepting an operation for triggering the vulnerability in accordance with an example of the present disclosure.

FIG. 7 is a flow chart illustrating a method for intercepting an operation for triggering the vulnerability in accordance with an example of the present disclosure.

In blocks 701 to 705, the vulnerability protection device 102 protects the vulnerability of the to-be-fixed object corresponding to the patch file information according to the vulnerability protection information. In practices, the vulnerability protection device 102 searches for (scans) the vulnerability corresponding to the vulnerability protection information in the to-be-fixed objects according to the vulnerability protection information after the vulnerability protection information from the vulnerability identification device 101 is received, sets the triggering information for the vulnerability after finding the vulnerability, monitors the triggering information and intercepts the operation for triggering the vulnerability after monitoring that the triggering information is triggered.

In block 701, the finding module 1021 finds the vulnerability according to the vulnerability protection information.

In practice, the finding module 1021 finds the vulnerability corresponding to the vulnerability protection information on the computer of the user according to the vulnerability protection information.

In blocks 702 to 705, the protection module 1022 protects the vulnerability according the vulnerability protection information.

In block 702, the setting module 10221 generates the triggering information according to the vulnerability protection information and sets the triggering information for the vulnerability. In practice, the setting module 10221 sets the triggering information for the vulnerability via the following methods. The setting module 10221 encrypts a file associated with the vulnerability. In any operation accessing the file, a correct key should be carried. In this example, encryption information is the triggering information. Any abnormal decryption operation performed on the file is the operation for triggering the vulnerability. A link file is added to a directory, at which the file associated with the vulnerability is located, so that the link file links the file associated with the vulnerability. Furthermore, accessing priorities are respectively set for the link file and the file associated with the vulnerability. The accessing priority of the link file is higher than that of the file associated with the vulnerability. In this example, the link file is the triggering information. An operation for accessing the link file is the operation for triggering the vulnerability.

In block 703, the monitoring module 10222 monitors whether the operation for triggering the vulnerability is performed according to the triggering information and generates the monitoring result. If the operation for triggering the vulnerability is not performed, block 703 is performed again. In practice, the monitoring module 10222 monitors the operation for triggering the vulnerability according to a triggering signal sent out by the triggering information.

In block 704, the interception module 10224 intercepts the operation for triggering the vulnerability if the monitoring result is finding the operation for triggering the vulnerability.

In block 705, the prompt module 10223 sends prompt information to the user if the monitoring result is finding the operation for triggering the vulnerability.

Figure 8:
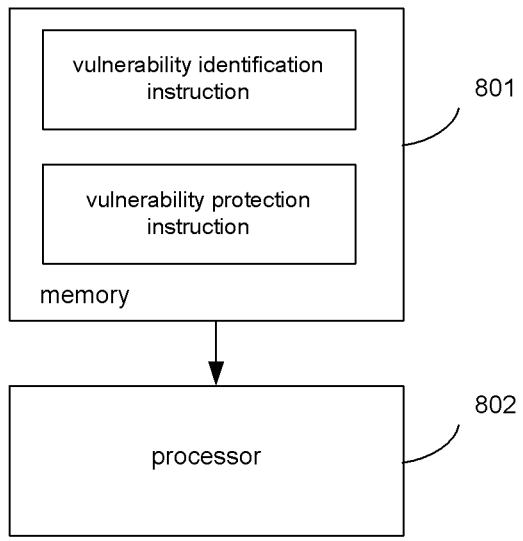
FIG. 8 is a schematic diagram illustrating structure of another security protection system in accordance with an example of the present disclosure.

FIG. 8 is a schematic diagram illustrating structure of another security protection system in accordance with an example of the present disclosure.

The security protection system includes: a memory 801 and a processor 802.

The memory 801 is to store a vulnerability identification instruction and a vulnerability protection instruction.

The processor 802 communicates with the memory 801, executes the vulnerability identification instruction and the vulnerability protection instruction to respectively execute the operations of the vulnerability identification device 101 and the vulnerability protection device 102.

The vulnerability identification instruction includes a collection instruction and a checking instruction. The processor is to execute the collection instruction and the checking instruction, to respectively execute the operations of the above collection module 1011 and the checking module 1012.

The checking instruction includes: an assembling instruction, a comparison instruction, a decompiling instruction and an analysis instruction. The processor 802 is further to execute the assembling instruction, the comparison instruction, the decompiling instruction and the analysis instruction to respectively execute the operations of the assembling module 10121, the comparison module 10122, the decompiling module 10123 and the analysis module 10124.

The vulnerability protection instruction includes a finding instruction and a protection instruction. The processor 802 is further to execute the finding instruction and the protection instruction, to respectively execute the operations of the finding module 1021 and the protection module 1022.

The protection instruction includes: a setting instruction, a monitoring instruction, a prompt instruction and an interception instruction. The processor 802 is further to execute the setting instruction, the monitoring instruction, the prompt instruction and the interception instruction, to respectively execute the operations of the setting module 10221, the monitoring module 10222, the prompt module 10223 and the interception module 10224.

In the present disclosure, the details of the vulnerability may be clearly obtained by comparing the patch files on the assembling level. Since the triggering information is set for the vulnerability, the operation for triggering the vulnerability is monitored to intercept the operation for triggering the vulnerability. The present disclosure may provide effective protection to the computer actively and timely and protect the vulnerability of the computer from illegal utilization.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A system comprising a memory and a processor, wherein the memory stores instructions that when executed by the processor, cause the processor to:
    monitor, in real-time, a patch file release to fix vulnerability of an object of a software installed in the system;
    collect patch file information of the patch file release;
    obtain, from source files of the software installed in the system, source file information of the installed software corresponding to the patch file information;
    assemble the patch file information to generate a first assembling result in an assembly language and assemble the source file information to generate a second assembling result in the assembly language;
    compare the first assembling result and the second assembling result to generate differences between the first assembling result and the second assembling result;
    decompile the differences into a high-level language to generate a de-compilation result;
    identify and analyze a vulnerability of the object corresponding to the patch file release according to the de-compilation result to generate vulnerability protection information corresponding to the vulnerability;
    encrypt a file associated with the vulnerability according to the vulnerability protection information; and
    generate a protection trigger for the vulnerability of the object corresponding to the patch file release when detecting an operation performing abnormal decryption activity on the encrypted file.

2. The system according to claim 1, wherein the instructions cause the processor to:
    search for the vulnerability according to the vulnerability protection information before encrypting the file associated with the vulnerability according to the vulnerability protection information.

3. The system according to claim 1, wherein the instructions executed to protect the vulnerability cause the processor to:
    intercept the operation upon the protection trigger.

4. The system according to claim 3, wherein the instructions further cause the processor to:
    send prompt information to a user informing the user of the protection trigger.

5. A method, comprising:
    monitoring, in real-time, by a system comprising a memory and processor, a patch file release to fix vulnerability of an object of a software installed in the system;
    collecting, by the system, patch file information of the patch file release;
    obtaining, by the system, source file information of the installed software corresponding to the patch file information;
    assembling, by the system, the patch file information to generate a first assembling result in an assembly language and assemble the source file information to generate a second assembling result in the assembly language;
    comparing, by the system, the first assembling result and the second assembling result to generate differences between the first assembling result and the second assembling result;
    decompiling, by the system, the differences into a high-level language to generate a de-compilation result;
    identifying and analyzing, by the system, a vulnerability of the object corresponding to the patch file release according to the de-compilation result to generate vulnerability protection information corresponding to the vulnerability;
    encrypting a file associated with the vulnerability according to the vulnerability protection information; and
    generating a protection trigger, by the system, for the vulnerability of the object corresponding to the patch file release when detecting an operation performing abnormal decryption activity on the encrypted file.

6. The method according to claim 5, further comprising:
    searching for the vulnerability according to the vulnerability protection information before encrypting the file associated with the vulnerability according to the vulnerability protection information.

7. The method according to claim 5, further comprising:
    intercepting the operation upon the protection trigger.

8. The method according to claim 7, further comprising:
    sending prompt information to a user informing the user of the protection trigger.

9. A non-transitory computer-readable medium storing instructions which, when executed by one or more processors, cause a device to perform a method, comprising:
    monitoring, in real-time, a patch file release to fix vulnerability of an object of a software installed in the device;
    collecting patch file information of the patch file release;
    obtaining source file information of the installed software corresponding to the patch file information according to the patch file information;
    assembling the patch file information to generate a first assembling result in an assembly language and assemble the source file information to generate a second assembling result in the assembly language;

comparing the first assembling result and the second assembling result to generate differences between the first assembling result and the second assembling result;

decompiling the differences into a high-level language to generate a de-compilation result;

identifying and analyzing a vulnerability of the object corresponding to the patch file release according to the de-compilation result to generate vulnerability protection information corresponding to the vulnerability;

encrypting a file associated with the vulnerability according to the vulnerability protection information; and generating a protection trigger for the vulnerability of the object corresponding to the patch file release when detecting an operation performing abnormal decryption activity on the encrypted file.

* * * * *